(12) United States Patent
Lopez

(10) Patent No.: US 11,148,274 B2
(45) Date of Patent: Oct. 19, 2021

(54) MULTI-TASK TOOL ASSEMBLY WITH DETACHABLE LOAD TENSION BODY

(71) Applicant: USA Products Group, Lodi, CA (US)

(72) Inventor: Manuel Lopez, Lodi, CA (US)

(73) Assignee: USA Products Group, Lodi, CA (US)

(*) Notice: Subject to any disclaimer, the term of this patent is extended or adjusted under 35 U.S.C. 154(b) by 359 days.

(21) Appl. No.: 16/412,594

(22) Filed: May 15, 2019

(65) Prior Publication Data

US 2020/0361071 A1 Nov. 19, 2020

(51) Int. Cl.
*B25F 1/00* (2006.01)
*F16G 11/10* (2006.01)
*B26B 11/00* (2006.01)

(52) U.S. Cl.
CPC .............. *B25F 1/00* (2013.01); *F16G 11/106* (2013.01); *B26B 11/001* (2013.01)

(58) Field of Classification Search
CPC .... F16G 11/105; F16G 11/106; B26B 11/001; B26B 11/00; B25F 1/00; B25F 1/02
See application file for complete search history.

(56) References Cited

U.S. PATENT DOCUMENTS

| | | | | |
|---|---|---|---|---|
| 10,219,610 | B1* | 3/2019 | Henkel | A45F 5/021 |
| 10,221,918 | B2* | 3/2019 | Simonson | F16G 11/106 |
| 10,851,872 | B2* | 12/2020 | Ballarin | F16G 11/048 |
| 10,859,134 | B2* | 12/2020 | Oldiges | F16G 11/046 |

* cited by examiner

*Primary Examiner* — David B. Thomas
(74) *Attorney, Agent, or Firm* — Duane Morris LLP

(57) ABSTRACT

A multi-task tool assembly comprising a first side and second side forming an enclosure; one or more utility tools connected at a first end of the enclosure between the first side and the second side and rotatable from a retracted position within the enclosure outward relative to the enclosure to an extended position; and a detachable load tension body connected at a second end of the enclosure, wherein the detachable load tension body is attachable and detachable from the multi-task tool assembly, is disclosed herein.

13 Claims, 7 Drawing Sheets

MULTI-TASK TOOL ASSEMBLY WITH DETACHABLE LOAD TENSION BODY

BACKGROUND

The present disclosure relates generally to a multi-task tool, and more particularly to a multi-task tool assembly having, among other things, a detachable load tension body for securing, supporting, restraining, or moving a load in an efficient and effective manner.

Tool assemblies such as those provide by Leatherman® include multiple utility tools such as a screwdriver, nail file, knife, wire cutter, awl, scissor, etc. These devices may be used for a multitude of endeavors and the assembly provides for convenient storage of the tools. Although such tool assemblies are well known, the assemblies fail to include a detachable load tension body.

As such, it would be desirable to provide a multi-task tool assembly having, among other things, a detachable load tension body for securing, supporting, retraining, or moving a load in an efficient and effective manner.

SUMMARY

For purposes of summarizing the disclosure, exemplary concepts have been described herein. It is to be understood that not necessarily all such concepts may be achieved in accordance with any particular embodiment. Thus, for example, those skilled in the art will recognize that embodiments may be carried out in a manner that achieves or optimizes one concept as taught herein without necessarily achieving other concepts as may be taught or suggested herein.

In one embodiment, a multi-task tool assembly comprises a first side and second side forming an enclosure; one or more utility tools connected at a first end of the enclosure between the first side and the second side and rotatable from a retracted position within the enclosure outward relative to the enclosure to an extended position; and a detachable load tension body connected at a second end of the enclosure, wherein the detachable load tension body is attachable and detachable from the multi-task tool assembly.

In another embodiment,

These and other embodiments will become apparent to those skilled in the art from the following detailed description of the various embodiments having reference to the attached figures, the disclosure not being limited to any particular embodiment.

DETAILED DESCRIPTION

Figure 1:
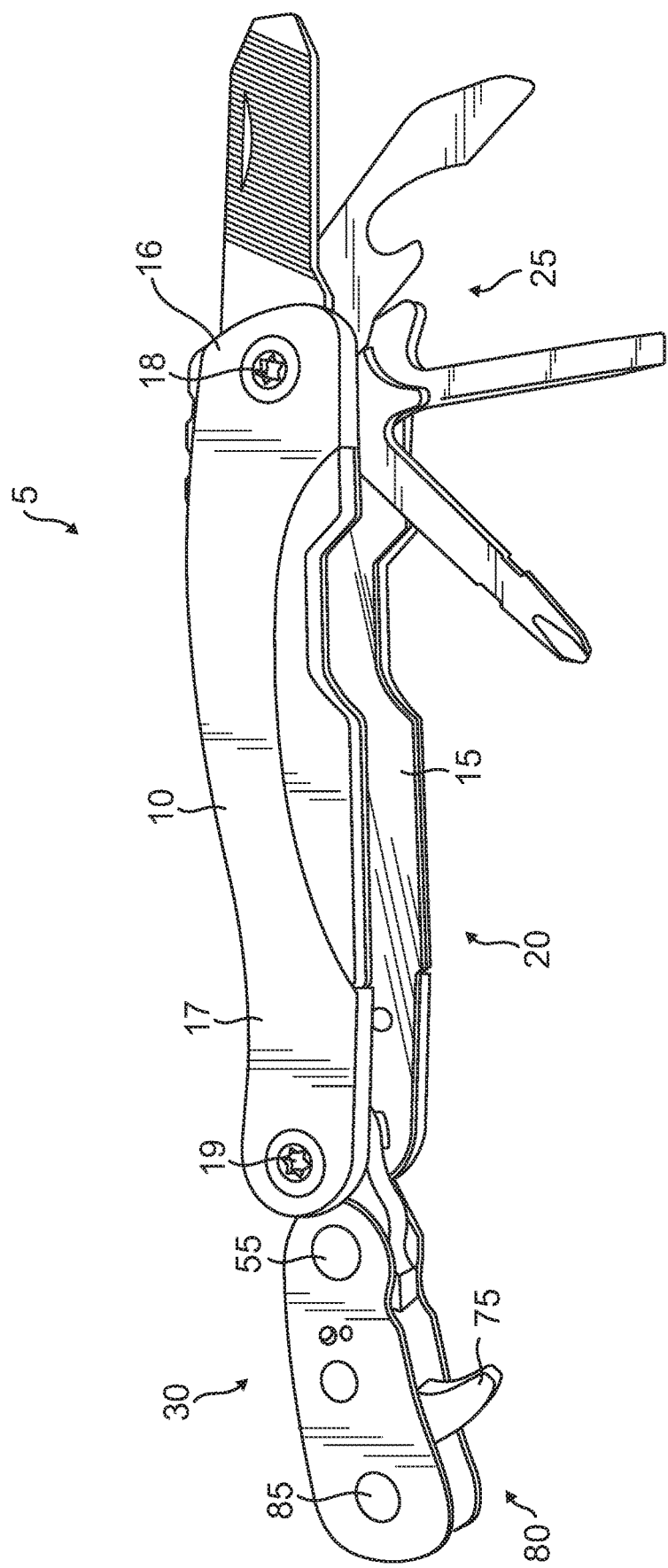
FIG. 1 shows a perspective view of a multi-task tool assembly including at least one utility tool in an extended position from a first end of the assembly and a detachable load tension body attached to the assembly in an extended position from a second end in accordance with one embodiment disclosed herein.

Exemplary embodiments will now be described with references to the accompanying figures, wherein like reference numbers refer to like elements throughout. The terminology used in the description presented herein in not intended to be interpreted in any limited or restrictive manner simply because it is being utilized in conjunction with a detailed description of certain embodiments. Furthermore, various embodiments (whether or not specifically described herein) may include novel features, no single one of which is solely responsible for its desirable attributes or which is essential to practicing any of the embodiments herein described.

The present disclosure relates generally to a multi-task tool, and more particularly to a multi-task tool assembly having, among other things, a detachable load tension body for securing, supporting, restraining, or moving a load or object in an efficient and effective manner.

As used herein, the term "detachable" is intended to describe the structure and function of a detachable load tension body that allows for the attachment or coupling of the detachable load tension body to a multi-task tool assembly and the detachment or removal of the detachable load tension body from the multi-task took assembly.

As used herein, the term "hub" is intended to include a spindle, a spool, a sheave, or a similar type article(s) that is configured or may be adapted to permit rotation of the hub to facilitate tensioning of a "strap" used for the purpose of applying tension to secure a "load".

As used herein, the term "strap" is intended to include a line, a rope (round synthetic, natural fiber, metal), a cable, a cord, a flat line (webbing), an anchor line or tensioning line, or a similar type of article(s) that may be adapted to be used with the load tension assembly disclosed herein for the purpose of applying tension, herein referred to as a "load tension", to secure a "load".

As used herein, the term "load" is intended to include any item or object that are generally secured to prevent movement of the item(s) while in a static position, or while being moved or transport from one position to another position.

The detachable load tension body described herein in combination with other elements facilitates, among other things, securing, supporting, restraining, or moving a load in an efficient and effective manner.

Various parts, elements, components, etc., of the multi-task tool assembly and the load tension body disclosed herein may be constructed from metal, plastic, composite, or other suitable material or combination thereof for providing a rigid and sturdy structure for the various parts, elements, components, etc., of the multi-task tool assembly and the detachable load tension body.

The actual size and dimension of any and all of the various parts, elements, components, etc., of the multi-task tool assembly and the detachable load tension body may vary depending on various factors including, among other things, intending application or usage, as well as the size of the load to be secured or prevented from moving while in a static position, or while being moved or transport from one position to another position.

Connection(s) between the various parts, elements, components, etc., of the multi-task tool assembly and the detachable load tension body may be accomplished using a variety of methods or processes. As such, the connections, whether integral and created via bending, or form molding, for example, or connected via bonding, hardware (nuts, bolts, washers, etc.), welding, or similar techniques, are well known in the art and omitted for simplicity.

The multi-task tool assembly provides an enclosure for various utility tools and for a detachable load tension body for securing, supporting, restraining, or moving a load in an efficient and effective manner.

Figure 2:
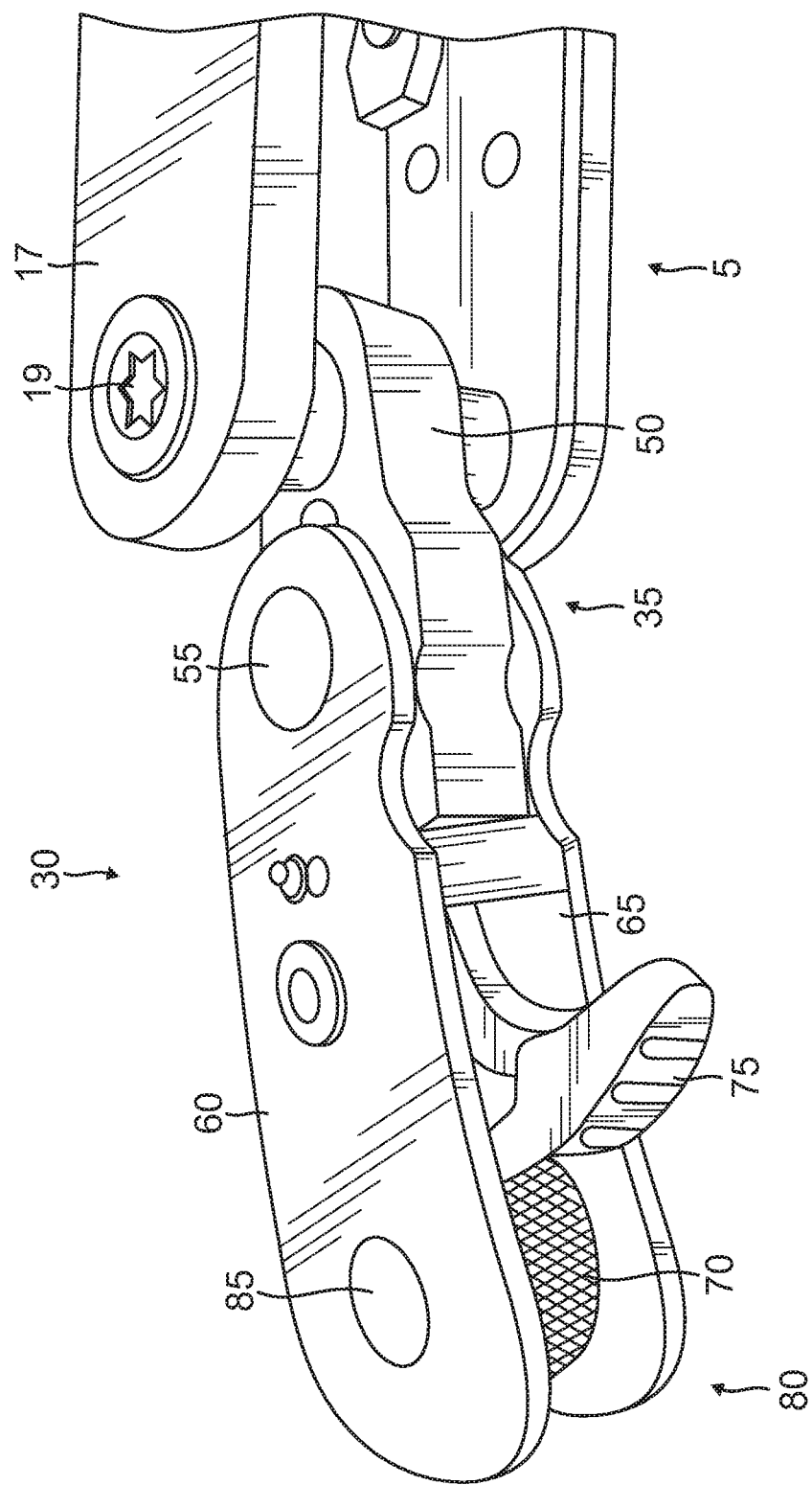
FIG. 2 shows a perspective view of the multi-task tool assembly with the detachable load tension body attached to the assembly in the extended position from the second end in accordance with one embodiment disclosed herein.
Figure 3:
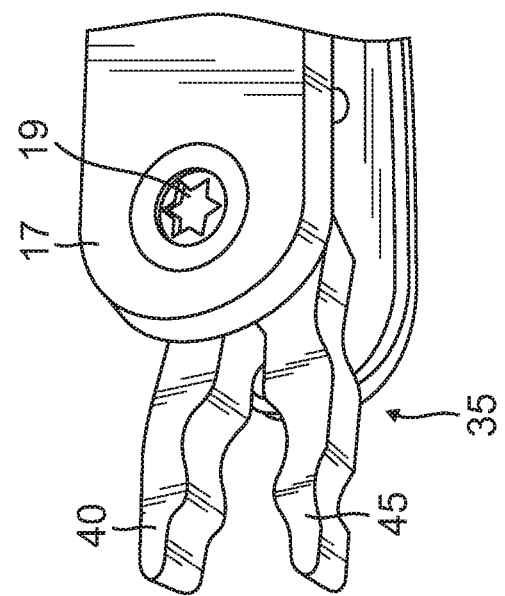
FIG. 3 shows a perspective view of the detachable load tension body detached from the multi-task tool assembly in accordance with one embodiment disclosed herein.
Figure 3:
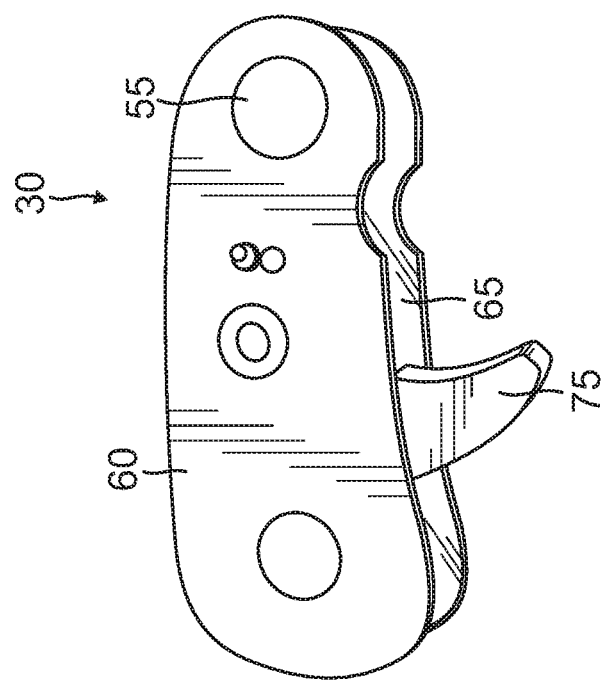
Figure 5:
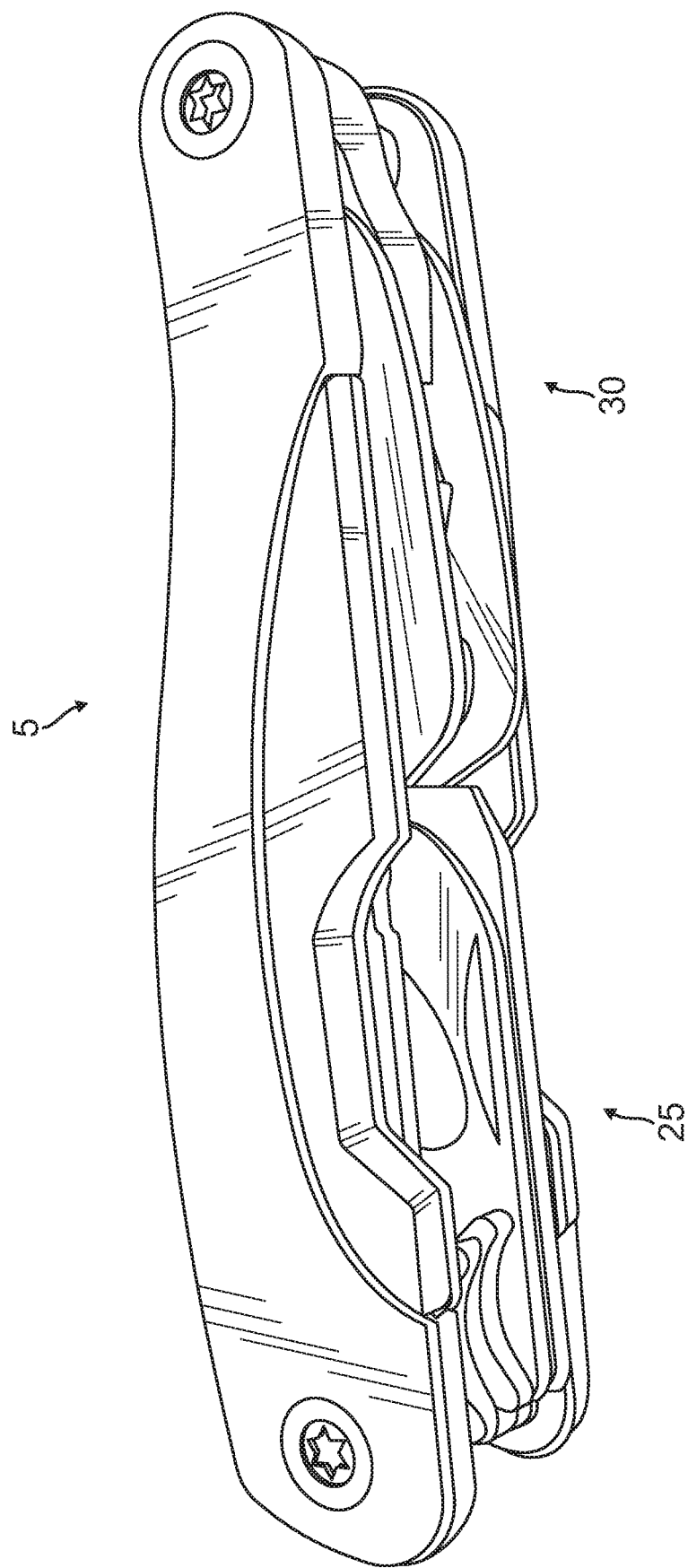
FIG. 5 shows a perspective view of the multi-task tool assembly with the at least one utility tool in a retracted position at the first end of the assembly and the detachable load tension body in a retracted position at the second end of the assembly in accordance with one embodiment disclosed herein.
Figure 6:
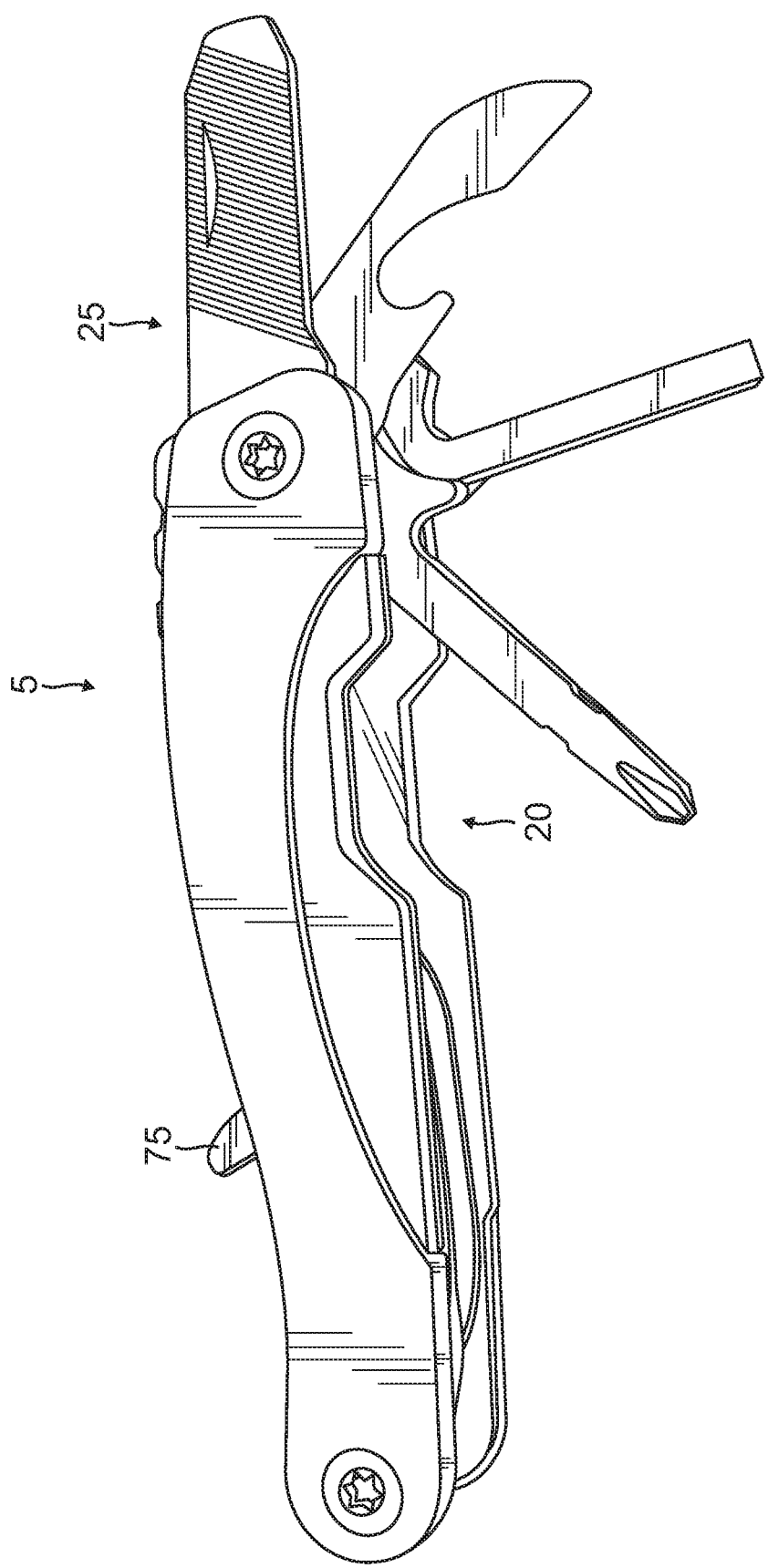
FIG. 6 shows a perspective view of the multi-task tool assembly with the at least one utility tool in the extended position at the first end of the assembly and the detachable load tension body in a retracted position at the second end of the assembly in accordance with one embodiment disclosed herein.

FIG. 1 shows a perspective view of a multi-task tool assembly including at least one utility tool in an extended position from a first end of the assembly and a detachable load tension body attached to the assembly in an extended position from a second end. As shown in FIG. 5, the multi-task tool assembly provides a sturdy structure to protect the utility tools and the detachable load tension body from damage and contaminants, as well as providing compact and convenient storage of the tools and detachable load tension body. FIG. 3 shows a perspective view of the load tension body detached from the multi-task tool assembly. When hooks or similar attachment devices and one or more straps or similar lines are combined, a load tension assembly is configured for securing, supporting, restraining, or moving a load in an efficient and effective manner. FIGS. 2, 3, and 6 show different views of the multi-task tool assembly including the detachable load tension body.

As shown in FIG. 1, the multi-task tool assembly 5 includes a first side 10 and a second side 15 that form an enclosure 20 where a detachable load tension body 30 may be disposed within the enclosure 20 in a retracted position (FIG. 5). The first side 10 is positioned opposite to the second side 15. The first side 10 and the second side are 15 joined to each other with various hardware elements. The first side 10 and the second side 15 share a common first end 16 and a common second end 17 opposite to the first end 16.

The multi-task tool assembly 5 further includes at least one component, hardware element, or utility tool 25 rotatable about the first end 16. Examples of utility tools 25 may include a box cutter, screwdriver, file, socket adaptor, etc. Each of the utility tools 25 include an orifice for accepting one or more hardware elements such as a screw, nut, spacer, washer, pin, etc., that permit the utility tools 25 to rotate about a first axis 18 at the first end 16 of the multi-task tool assembly 5 from a retracted position as shown in FIG. 5 within the enclosure between the first side 10 and second side 15 to an extended position as shown in FIG. 1 outside the enclosure 20 formed by the first side 10 and second side 15. The utility tools 25 are retained in the retracted position at the first end 16 within the enclosure 20 between the first side 10 and second side 15 of the multi-task tool assembly 5 and are rotatable relative to the enclosure 20 outward or away from the enclosure 20 to the extended position. Likewise, the utility tools 25 are rotatable from the extended position inward or toward the enclosure 20 to the retracted position within the multi-task tool assembly 5.

As shown in FIG. 2 and FIG. 3, a clip 35 is positioned at the second end 17 of the multi-tool assembly 5 and rotatable about a second axis 19. As more clearly shown in FIG. 2, the clip 35 includes a first end 50 positioned about the second end 19 of the multi-task tool assembly 5 with one or more hardware elements such as a screw, nut, spacer, washer, pin, etc., that permit rotation of the clip 35 about the second axis 19 at the second end 17 of the multi-task tool assembly 5. The clip 35 includes a first leg 40 and a second leg 45 extending from the first end 50. The first leg 40 is spaced apart from the second leg 45 with the first leg 40 and the second leg 45 correspondingly shaped to accept and retain a first end 55 of the detachable load tension body 30 therebetween. When the first end 55 is place between the first leg 40 and second leg 45 and a force is applied to the detachable load tension body 30 in a direction toward the first end 50, (1) the detachable load tension body 30 is moved between the first leg 40 and the second leg 45 of the clip 35, (2) the first leg 40 and second leg 45 are moved apart, and (3) the first end 55 of the detachable load tension body 30 is attached, coupled or retained to the clip 35 at the second end 17 of the multi-task tool assembly 5 by a force of material memory. When a force is applied to the detachable load tension body 30 in a direction away from the first end 55 to overcome the force of material memory, the detachable load tension body 30 is detached or removed from the clip 35 and the multi-task tool assembly 5. Accordingly, the clip 35 facilitates rotation of the detachable load tension body 30 about the second axis 19 of the multi-task tool assembly 5 from a retracted position within the enclosure 20 to an extended position outward from the enclosure 20. The clip 35 further facilitates attachment and detachment of the detachable load tension body 30 from the clip 35 and the multi-task tool assembly 5. As such, the detachable load tension body 30 is attachable and detachable from the clip 35 and multi-task tool assembly 5.

In an alternative embodiment the first end 50 of the clip 35 may be positioned about the first end 55 of the detachable load tension body, the first leg 40 and second leg 45 of the clip extending from the first end 50 of the clip 35. The first leg 40 is spaced apart from the second leg 45 with the first leg 40 and the second leg 45 correspondingly shaped to accept and retain the second end 17 of the multi-task tool assembly 5 therebetween. When the second end 17 of the multi-task tool assembly is place between the first leg 40 and second leg 45 and a force is applied to the detachable load tension body 30 in a direction toward the second end 17, (1) the multi-task tool assembly 5 is moved between the first leg 40 and the second leg 45 of the clip 35, (2) the first leg 40 and second leg 45 are moved apart, and (3) the second end 17 of the multi-task tool assembly is attached, coupled or retained to the clip 35 at the first end 55 of the multi-task tool assembly 5 by a force of material memory. When a force is applied to the detachable load tension body 30 in a direction away from the second end 17 of the multi-task tool assembly 5 to overcome the force of material memory, the multi-task tool assembly 5 is detached or removed from the clip 35 and the detachable load tension assembly 30. Accordingly, the clip 35 facilitates rotation of the detachable load tension body 30 about the second axis 19 of the multi-task tool assembly 5 from a retracted position within the enclosure 20 to an extended position outward from the enclosure 20. The clip 35 further facilitates attachment and detachment of the detachable load tension body 30 from the multi-task tool assembly 5. As such, the detachable load tension body 30 is attachable and detachable from the multi-task tool assembly 5.

As shown in FIG. 2, the detachable load tension body 30 includes a first sidewall 60 and a second sidewall 65 spaced apart and connected to each other. The first sidewall 60 and the second sidewall 65 provide spacing and support for various elements disposed between the first sidewall 60 and the second sidewall 65. A hub 70, a trigger mechanism 75, and a tension spring 77 (FIGS. 4A and 4B) are disposed between the first sidewall 60 and second sidewall 65. The detachable load tension body 30 facilitates securing, supporting, restraining, or moving a load in an efficient and effective manner. In one embodiment the hub 70, trigger mechanism 75, and tension spring 77 may constitute a slip cam.

The hub 70, trigger mechanism 75, and tension spring 77 each include an orifice for accepting one or more hardware elements such as a screw, nut, spacer, washer, pin, etc., which permit the hub 70, trigger mechanism 75, and tension spring 77 to rotate at a second end 80 of the detachable load tension body 30. In this regard, the hub 70 is rotatable about a third axis 85 at the second end 80 of the detachable load tension body 30 and may include a knurled surface, for example outwardly extending teeth. The tension spring 77 biases the trigger mechanism 75 toward the hub 70. The trigger mechanism 75 and the hub 70 may each include a plurality of outwardly extending teeth for engagement with a line or strap 90.

Figure 4B:
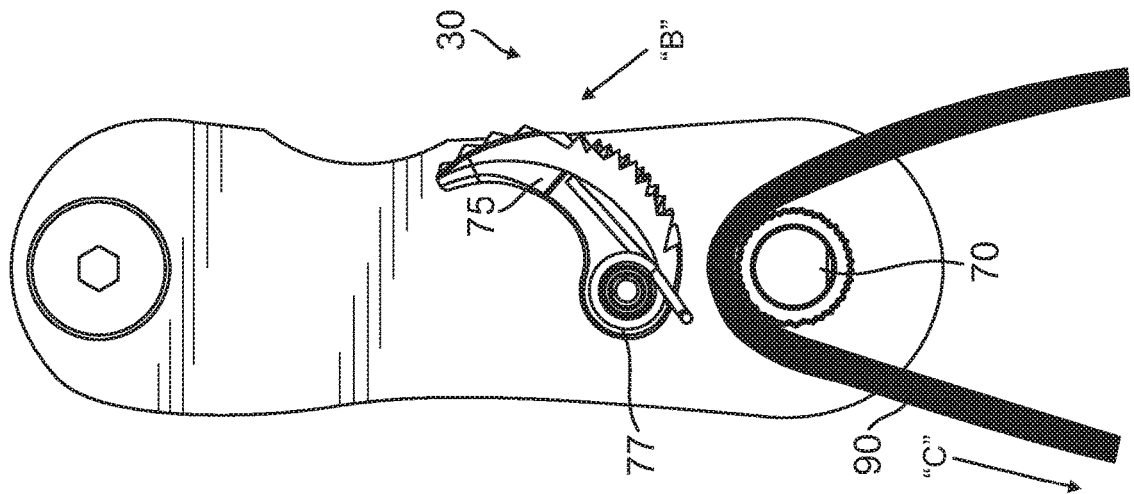
FIG. 4B shows an exemplary detachable load tension body of the multi-task tool assembly with a trigger mechanism in a release position in accordance with one embodiment disclosed herein
Figure 4A:
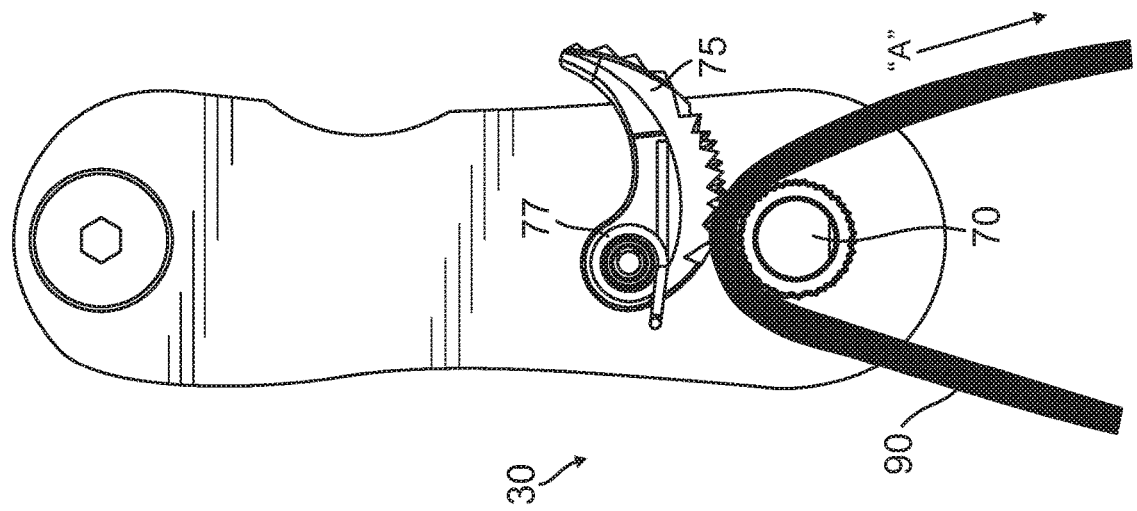
FIG. 4A shows an exemplary detachable load tension body of the multi-task tool assembly with a trigger mechanism in a secure position in accordance with one embodiment disclosed herein.
Figure 7:
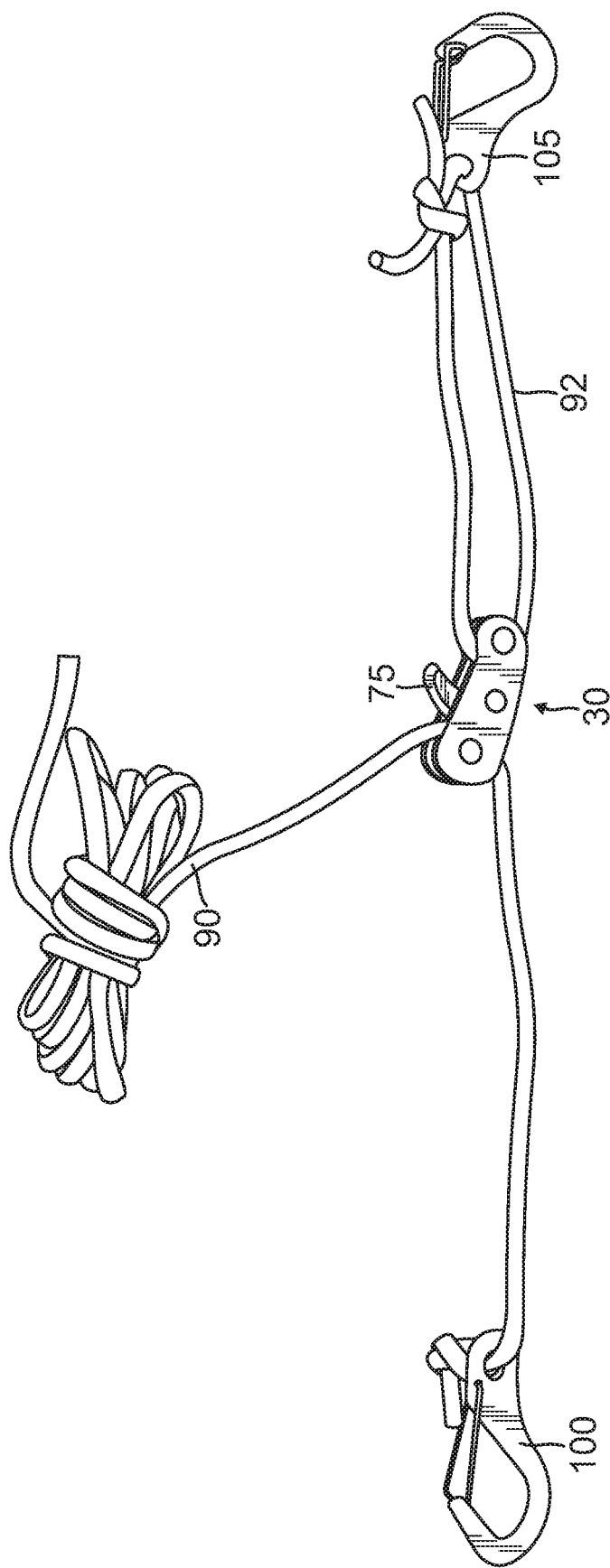
FIG. 7 shows a perspective view of a load tension assembly including the load tension body detached from the multi-task tool assembly in accordance with one embodiment disclosed herein.

As shown in FIGS. 4A and 4B the trigger mechanism 75 may be rotated back and forth from a secure position to a release position. As shown in FIG. 4A, in the secure position the tension spring 77 biases the trigger mechanism 75 toward the hub 70 to secure the strap 90 from moving when a load tension is applied to one end of the strap 90 (FIG. 7). As a force is applied to the strap 90 in the direction shown by arrow "A" the tension of the tension spring 77 on the trigger mechanism 75 is overcome and the strap 90 is moved between the trigger mechanism 75 and the hub 70 to move or secure the load. When the force in direction "A" is removed, the strap 90 is retained between the trigger mechanism 75 and the hub 70. As shown in FIG. 4B, as a force is applied to the trigger mechanism 75 in the direction shown by arrow "B" the trigger mechanism 75 is moved away from contact with the strap 90 to the release position. In this regard, when the trigger mechanism 75 is moved from the secure position to the release position the load tension on the strap 90 moves the strap 90 in the direction shown by arrow "C".

FIG. 7 shows a perspective view of a load tension assembly 95 including the detachable load tension body 30 detached from the multi-task tool assembly 5. The detachable load tension body 30 in combination with other elements facilitates, among other things, securing, supporting, restraining, or moving a load in an efficient and effective manner. In this regard, a method of the detachable load tension body 30 includes, (1) anchoring or attaching a first hook or similar attachment device 100 to a first point or load, (2) positioning a first strap 90 such as a flat webbing, rope, chord, etc., attached to the attachment device 100 between the trigger mechanism 75 and the hub 70, (3) attaching second hook or similar attachment device 105 with a second strap 92 attached to a second point, and (4) applying a load tension to the first strap 90. Applying a force to the first strap 90 moves the strap 90 between the trigger mechanism 75 and the hub 70, and facilitates rotation of the hub 70. As the hub 70 rotates, a load tension is applied to the first strap 90 and the second strap 92 and the load is secured or moved. The trigger mechanism 75 is biased in the secure position by the tension spring 77 to prevent rotation of the hub 70, and movement of the strap 90 in the direction of the load. When biased in the secure position the trigger mechanism 75 engages the first strap 90 and forces the first strap 90 against the hub 70 to maintain the load tension and prevent movement of the load. When the trigger mechanism 75 is moved away from the first strap 90 and placed in the release position the load tension placed on the first strap 90 moves the strap 90 in the direction of the load. As such, the detachable load tension body 30 in combination with other elements facilitates, among other things, securing, supporting, restraining, or moving a load in an efficient and effective manner.

Although the method(s)/step(s) are illustrated and described herein as occurring in a certain order, the specific order, or any combination or interpretation of the order, is not required. Obvious modifications will make themselves apparent to those skilled in the art, all of which will not depart from the essence of the disclosed subject matter, and all such changes and modifications are intended to be encompassed within the appended claims.

What is claimed is:

1. A multi-task tool assembly comprising:
   a first side and a second side forming an enclosure;
   one or more utility tools connected at a first end of the multi-task tool assembly between the first side and the second side and rotatable from a retracted position within the enclosure outward relative to the enclosure to an extended position; and
   a detachable load tension body rotatably connected at a second end of the multi-task tool assembly,
   wherein the detachable load tension body is attachable and detachable from the multi-task tool assembly.

2. The multi-task tool assembly of claim 1, wherein the detachable load tension body is rotatable from a retracted position within the enclosure between the first side and the second side outward relative to the enclosure to an extended position.

3. The multi-task tool assembly of claim 2, wherein the detachable load tension body is a slip cam comprising:
   a first sidewall and a second sidewall spaced apart and connected to each other; and
   a trigger mechanism, a hub, and a tension spring disposed between the first sidewall and the second sidewall,
   wherein the hub is rotatable, the tension spring is connected to the trigger mechanism and biases the trigger mechanism toward the hub in the secure position to secure a load tension, and rotation of the trigger mechanism away from the hub overcomes the bias of the tension spring and releases the load tension in the release position.

4. The multi-task tool assembly of claim 3, wherein the trigger mechanism includes a surface partially extended from the detachable load tension body to receive a force to move the trigger mechanism to the release position.

5. The multi-task tool assembly of claim 1, further comprising a clip having a first end rotatably connected to the second end of the multi-task tool assembly,
   wherein the clip includes a first leg and a second leg opposite the first leg, each leg extending from the first end of the clip, spaced apart from each other, and correspondingly shaped to accept a first end of the detachable load tension body therebetween.

6. The multi-task tool assembly of claim 5, wherein material memory retains the detachable load tension body between the first leg and the second leg of the clip.

7. The multi-task tool assembly of claim 6, wherein the detachable load tension body is rotatable from a retracted position within the enclosure between the first side and the second side outward relative to the enclosure to an extended position when retained by the clip.

8. The multi-task tool assembly of claim 7, wherein the detachable load tension body is detachable from the clip and the multi-task tool assembly.

9. The multi-task tool assembly of claim 8, wherein the detachable load tension body is a slip cam.

10. A multi-task tool assembly comprising:
a first side and second side forming an enclosure;
one or more utility tools connected at a first end of the multi-task tool assembly between the first side and the second side and rotatable from a retracted position within the enclosure outward relative to the enclosure to an extended position;
a clip rotatably connected to a second end of the multi-task tool assembly; and
a detachable load tension body rotatably connected to the clip,
wherein the detachable load tension body is rotatable from a retracted position within the enclosure between the first side and the second side outward relative to the enclosure to an extended position; and
wherein the detachable load tension body is attachable and detachable from either the clip or the multi-task tool assembly.

11. The multi-task tool assembly of claim 10, wherein the clip includes a first leg and a second leg opposite the first leg, each leg extending from the first end of the clip, spaced apart from each other, and correspondingly shaped to accept the second end of the multi-task tool assembly therebetween.

12. The multi-task tool assembly of claim 11, wherein material memory retains the multi-task tool assembly between the first leg and the second leg of the clip.

13. The multi-task tool assembly of claim 12, wherein the detachable load tension body is attachable and detachable from the multi-task tool assembly.

\* \* \* \* \*